(12) United States Patent
Poteet et al.

(10) Patent No.: US 10,480,119 B2
(45) Date of Patent: Nov. 19, 2019

(54) METHOD OF APPLYING OXIDATION PROTECTION COATING TO CARBON FIBERS

(71) Applicant: Goodrich Corporation, Charlotte, NC (US)

(72) Inventors: Steven A. Poteet, Hamden, CT (US); Gavin Charles Richards, Windsor, CT (US)

(73) Assignee: Goodrich Corporation, Charlotte, NC (US)

( * ) Notice: Subject to any disclaimer, the term of this patent is extended or adjusted under 35 U.S.C. 154(b) by 273 days.

(21) Appl. No.: 15/352,030

(22) Filed: Nov. 15, 2016

(65) Prior Publication Data
US 2018/0135240 A1 May 17, 2018

(51) Int. Cl.
*D06M 11/83* (2006.01)
*B05D 1/18* (2006.01)
(Continued)

(52) U.S. Cl.
CPC ............... *D06M 11/83* (2013.01); *B05D 1/02* (2013.01); *B05D 1/18* (2013.01); *B05D 1/28* (2013.01); *B05D 5/00* (2013.01); *C04B 35/628* (2013.01); *C04B 35/62847* (2013.01); *C04B 35/62849* (2013.01); *C04B 35/62852* (2013.01); *C04B 35/62855* (2013.01); *C04B 35/62886* (2013.01); *C04B 35/632* (2013.01); *C04B 35/83* (2013.01); *F16D 69/023* (2013.01); *C04B 2235/3208* (2013.01); *C04B 2235/3217* (2013.01); *C04B 2235/3232* (2013.01); *C04B 2235/3244* (2013.01); *C04B 2235/3418* (2013.01); *C04B 2235/441* (2013.01); *C04B 2235/443* (2013.01); *C04B 2235/5248* (2013.01);
(Continued)

(58) Field of Classification Search
CPC ..................................................... D06M 11/83
See application file for complete search history.

(56) References Cited

U.S. PATENT DOCUMENTS

| 4,373,006 A | 2/1983 | Galasso |
| 5,102,698 A | 4/1992 | Cavalier et al. |

(Continued)

FOREIGN PATENT DOCUMENTS

| EP | 3112328 | 1/2017 |
| EP | 3181720 | 6/2017 |

(Continued)

OTHER PUBLICATIONS

European Patent Office, European Search Report dated Jun. 29, 2018 in Application No. 17201872.3-1101.
(Continued)

*Primary Examiner* — Timothy Kennedy
(74) *Attorney, Agent, or Firm* — Snell & Wilmer, L.L.P.

(57) ABSTRACT

A method for coating a carbon fiber for a composite structure may comprise applying a slurry onto a surface of the carbon fiber, wherein the slurry is a sol gel comprising a metal precursor and a carrier fluid, and heating the carbon fiber to a temperature sufficient to form a sol gel-derived layer on the carbon fiber. The slurry may comprise a metal precursor such as a metal salt or a metal alkoxide. The sol gel-derived layer may help prevent the carbon fiber from oxidizing.

11 Claims, 6 Drawing Sheets

(51) Int. Cl.
  *B05D 1/02* (2006.01)
  *B05D 1/28* (2006.01)
  *B05D 5/00* (2006.01)
  *F16D 69/02* (2006.01)
  *C04B 35/628* (2006.01)
  *C04B 35/632* (2006.01)
  *C04B 35/83* (2006.01)

(52) U.S. Cl.
  CPC ...... *D10B 2101/12* (2013.01); *D10B 2505/12* (2013.01); *F16D 2200/0052* (2013.01)

(56) References Cited

U.S. PATENT DOCUMENTS

| | | |
|---|---|---|
| 5,164,229 A | 11/1992 | Hay |
| 5,238,711 A * | 8/1993 | Barron ................... C04B 41/87 427/113 |
| 5,380,556 A | 1/1995 | Hocquellet |
| 5,562,966 A | 10/1996 | Clarke |
| 5,955,197 A | 9/1999 | Skowronski et al. |
| 6,383,972 B1 | 5/2002 | Parmentier et al. |
| 8,383,197 B2 | 2/2013 | La Forest et al. |
| 9,321,692 B2 | 4/2016 | Koucouthakis et al. |
| 2003/0161781 A1* | 8/2003 | Cabasso ................ B01D 53/02 423/445 R |
| 2004/0038043 A1 | 2/2004 | Golecki |
| 2010/0015332 A1* | 1/2010 | Rollin .................... C04B 35/83 427/228 |
| 2010/0236686 A1 | 9/2010 | Sambasivan |
| 2015/0232647 A1 | 8/2015 | Mun |
| 2016/0123416 A1 | 5/2016 | Perea |

FOREIGN PATENT DOCUMENTS

| | | |
|---|---|---|
| EP | 3248957 | 11/2017 |
| JP | 2000017569 A | 1/2000 |

OTHER PUBLICATIONS

European Patent Office, European Partial Search Report dated Mar. 22, 2018 in Application No. 17201872.3-1101.

Wang HJ et al: "Preparation and oxidation behavior of three-dimensional braided carbon fiber coated by SiC", Materials Letters, Elsevier, Amsterdam, NL, vol. 59, No. 4, Feb. 1, 2005 (Feb. 1, 2005), pp. 486-490.

Gao P-Z et al: "Influence of Si02 coating preparation process on the oxidation resistance of 30 carbon fiber braids", Journal of Inorganic Materials—Wuji Cailiao Xuebao, Kexue Chubanshe—Science Press, CN, vol. 18, No. 4, Jun. 30, 2003 (Jun. 30, 2003), pp. 849-854.

European Patent Office, European Office Action dated Jun. 3, 2019 in Application No. 17201872.3.

* cited by examiner

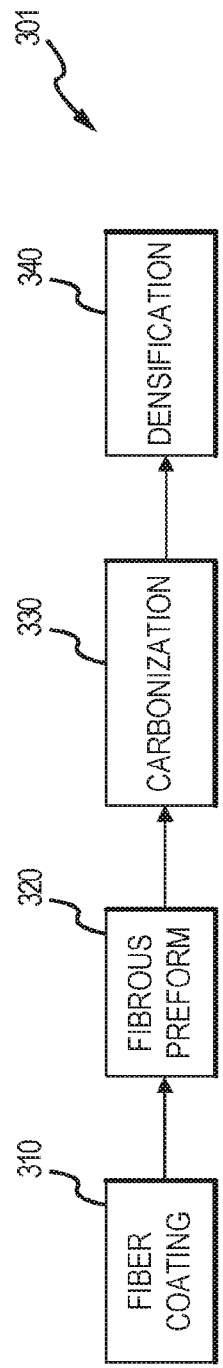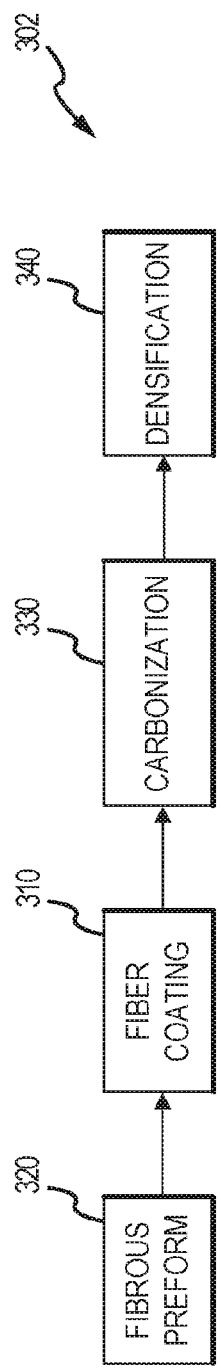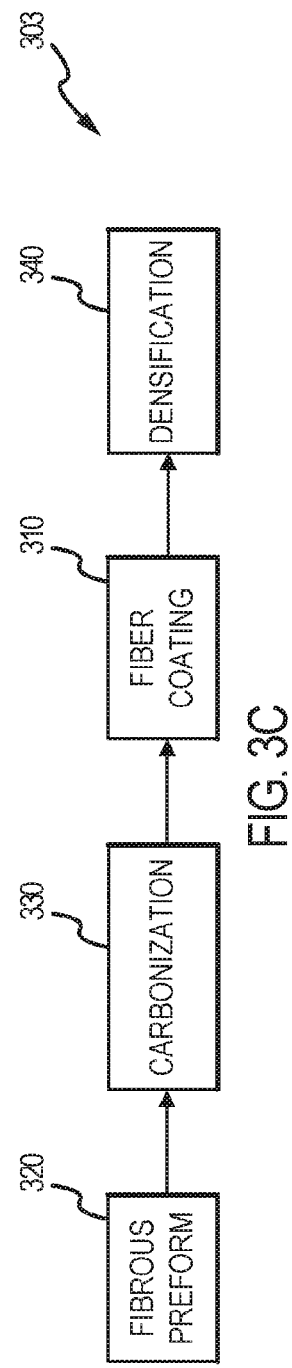

METHOD OF APPLYING OXIDATION PROTECTION COATING TO CARBON FIBERS

FIELD

The present disclosure relates generally to carbon-carbon composites and, more specifically, to oxidation protection systems for carbon-carbon composite structures.

BACKGROUND

Oxidation protection systems for carbon-carbon composites are typically designed to minimize loss of carbon material due to oxidation at operating conditions, which include temperatures as high as 900° C. (1652° F.). Phosphate-based oxidation protection systems may reduce infiltration of oxygen and oxidation catalysts into the composite structure. However, despite the use of such oxidation protection systems, significant oxidation of the carbon-carbon composites may still occur during operation of components such as, for example, aircraft braking systems.

SUMMARY

A method for coating a carbon fiber for a composite structure is provided, in accordance with various embodiments, comprising applying a slurry onto a surface of the carbon fiber, wherein the slurry is a sol gel comprising a metal precursor and a carrier fluid, and heating the carbon fiber to a temperature sufficient to form a sol gel-derived layer on the carbon fiber.

In various embodiments, the metal precursor may comprise at least one of an aluminum compound, a silicon compound, a zirconium compound, a titanium compound, or a calcium compound. The metal precursor may comprise at least one of a metal salt or a metal alkoxide. The metal precursor may comprise at least one of aluminum nitrate, calcium nitrate, aluminum isopropoxide, aluminum sec-butoxide, aluminum oxide, tetraethylorthosilicate (TEOS), zirconium n-propoxide, and titanium isopropoxide. Applying the slurry may be completed by at least one of submerging the carbon fiber into a slurry bath, spraying the slurry onto the surface of the carbon fiber, or brushing the slurry onto the surface of the carbon fiber. The sol gel-derived layer may be configured to help prevent the carbon fiber from oxidizing. The slurry may be substantially free of at least one of phosphate glass or acid aluminum phosphate. The slurry may further comprise a pH modifier. The pH modifier may be at least one of acetic acid, ammonium hydroxide, nitric acid, or hydrochloric acid.

A method for coating a carbon fiber for a composite structure is provided, in accordance with various embodiments, comprising applying a slurry comprising tetraethylorthosilicate (TEOS) onto the carbon fiber, heating the slurry to a temperature sufficient to form a protective layer on the carbon fiber, and condensing the slurry into a silicon oxide.

In various embodiments, the protective layer may be configured to aid in preventing oxidation of the carbon fiber. Applying the slurry may be completed by at least one of submerging the carbon fiber into a slurry bath, spraying the slurry onto the carbon fiber, or brushing the slurry onto the carbon fiber. The temperature may be between 100° C. (212° F.) to about 1100° C. (2012° F.). The protective layer may encase the carbon fiber. The carbon fiber may comprise at least one of a sheet of carbon fibers or a carbon fiber preform.

A method for manufacturing a composite structure is provided, in accordance with various embodiments, comprising forming an oxidized polyacrylonitrile fiber (OPF) preform from a plurality of carbon fibers, carbonizing the OPF preform, applying a slurry to the OPF preform, heating the OPF preform and the slurry to a temperature sufficient to form a protective layer on the plurality of carbon fibers, and densifying the OPF preform to form the composite structure. The applying the slurry may be completed by at least one of submerging the plurality of carbon fibers into a slurry bath, spraying the slurry onto a surface of the plurality of carbon fibers, or brushing the slurry onto the surface of the plurality of carbon fibers. The protective layer may be configured to aid in preventing oxidation of the plurality of carbon fibers. The slurry may comprise at least one of aluminum nitrate, calcium nitrate, aluminum sec butoxide, aluminum tri-sec butoxide, aluminum isopropoxide, aluminum oxide, and tetraethylorthosilicate (TEOS). The method may further comprise applying a second protective layer to an outer surface of the composite structure.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIGS. 3A, 3B, and 3C illustrate flow charts of carbon/carbon (C/C) composite structure manufacturing processes, in accordance with various embodiments.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

Figure 1A:
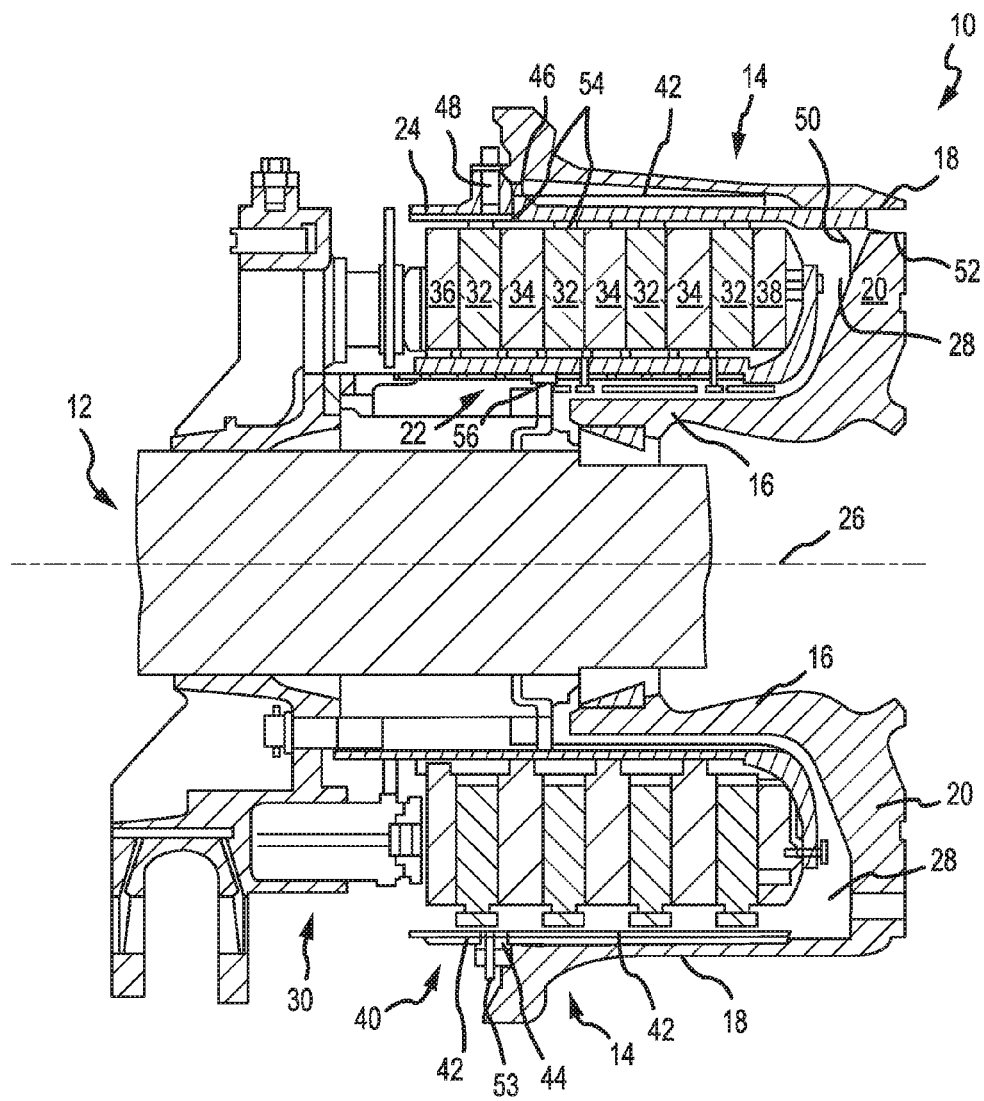
FIG. 1A illustrates a cross sectional view of an aircraft wheel braking assembly, in accordance with various embodiments.
Figure 1B:
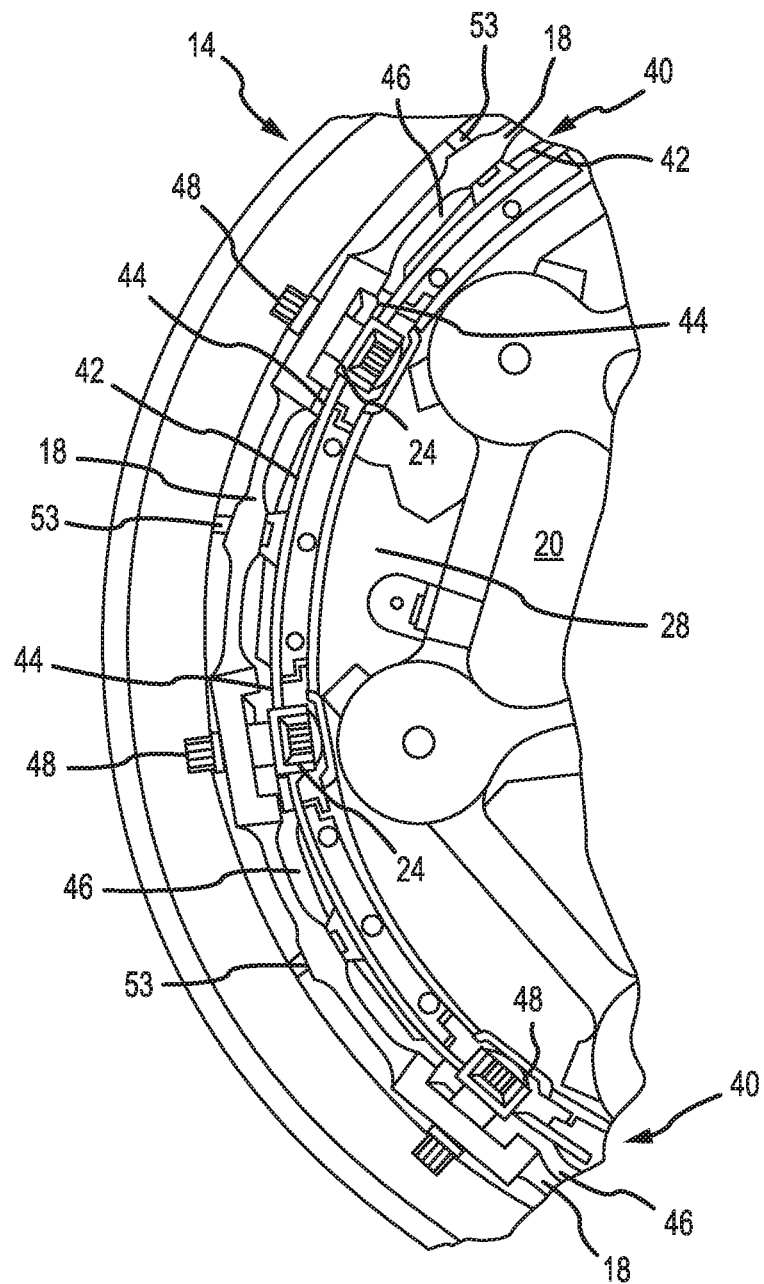
FIG. 1B illustrates a partial side view of an aircraft wheel braking assembly, in accordance with various embodiments.

With initial reference to FIGS. 1A and 1B, aircraft wheel braking assembly 10, such as may be found on an aircraft in accordance with various embodiments, is illustrated. Aircraft wheel braking assembly 10 may, for example, comprise a bogie axle 12, a wheel 14 including a hub 16 and a wheel well 18, a web 20, a torque take-out assembly 22, one or more torque bars 24, a wheel rotational axis 26, a wheel well recess 28, an actuator 30, multiple brake rotors 32, multiple brake stators 34, a pressure plate 36, an end plate 38, a heat shield 40, multiple heat shield sections 42, multiple heat shield carriers 44, an air gap 46, multiple torque bar bolts 48, a torque bar pin 50, a wheel web hole 52, multiple heat shield fasteners 53, multiple rotor lugs 54, and multiple stator slots 56. FIG. 1B illustrates a portion of aircraft wheel braking assembly 10 as viewed into wheel well 18 and wheel well recess 28.

In various embodiments, the various components of aircraft wheel braking assembly 10 may be subjected to the application of compositions and methods for protecting the components from oxidation.

Brake disks (e.g., interleaved rotors 32 and stators 34) are disposed in wheel well recess 28 of wheel well 18. Rotors 32 are secured to torque bars 24 for rotation with wheel 14, while stators 34 are engaged with torque take-out assembly 22. At least one actuator 30 is operable to compress interleaved rotors 32 and stators 34 for stopping the aircraft. In this example, actuator 30 is shown as a hydraulically actuated piston, but many types of actuators are suitable, such as an electromechanical actuator. Pressure plate 36 and end plate 38 are disposed at opposite ends of the interleaved rotors 32 and stators 34. Rotors 32 and stators 34 can comprise any material suitable for friction disks, including ceramics or carbon materials, such as a carbon/carbon composite.

Through compression of interleaved rotors 32 and stators 34 between pressure plates 36 and end plate 38, the resulting frictional contact slows rotation of wheel 14. Torque take-out assembly 22 is secured to a stationary portion of the landing gear truck such as a bogie beam or other landing gear strut, such that torque take-out assembly 22 and stators 34 are prevented from rotating during braking of the aircraft.

Carbon-carbon composites (also referred to herein as composite structures, composite substrates, and carbon-carbon composite structures, interchangeably) in the form of friction disks are commonly used for aircraft brake disks and race car brake and clutch disks. Carbon/carbon brake disks are especially useful in these applications because of the superior high temperature characteristics of C/C material. In particular, the carbon/carbon material used in C/C parts is a good conductor of heat and is able to dissipate heat generated during braking away from the braking surfaces. Carbon/carbon material is also highly resistant to heat damage, and thus, is capable of sustaining friction between brake surfaces during severe braking without a significant reduction in the friction coefficient or mechanical failure.

Carbon-carbon composites in the form of friction disks may operate as a heat sink to absorb large amounts of kinetic energy converted to heat during slowing of the aircraft. Heat shield 40 may reflect thermal energy away from wheel well 18 and back toward rotors 32 and stators 34. With reference to FIG. 1A, a portion of wheel well 18 and torque bar 24 is removed to better illustrate heat shield 40 and heat shield segments 42. With reference to FIG. 1B, heat shield 40 is attached to wheel 14 and is concentric with wheel well 18. Individual heat shield sections 42 may be secured in place between wheel well 18 and rotors 32 by respective heat shield carriers 44 fixed to wheel well 18. Air gap 46 is defined annularly between heat shield segments 42 and wheel well 18.

Torque bars 24 and heat shield carriers 44 can be secured to wheel 14 using bolts or other fasteners. Torque bar bolts 48 can extend through a hole formed in a flange or other mounting surface on wheel 14. Each torque bar 24 can optionally include at least one torque bar pin 50 at an end opposite torque bar bolts 48, such that torque bar pin 50 can be received through wheel web hole 52 in web 20. Heat shield sections 42 and respective heat shield carriers 44 can then be fastened to wheel well 18 by heat shield fasteners 53.

Under the operating conditions (e.g., high temperature) of aircraft wheel braking assembly 10, carbon-carbon composites may be prone to material loss from oxidation of the carbon. For example, various carbon-carbon composite components of aircraft wheel braking assembly 10 may experience both catalytic oxidation and inherent thermal oxidation caused by heating the composite during operation. In various embodiments, composite rotors 32 and stators 34 may be heated to sufficiently high temperatures that may oxidize the carbon surfaces exposed to air. At elevated temperatures, infiltration of air and contaminants may cause internal oxidation and weakening, especially in and around brake rotor lugs 54 or stator slots 56 securing the friction disks to the respective torque bar 24 and torque take-out assembly 22. Because carbon-carbon composite components of aircraft wheel braking assembly 10 may retain heat for a substantial time period after slowing the aircraft, oxygen from the ambient atmosphere may react with the carbon matrix and/or carbon fibers to accelerate material loss. Further, damage to brake components may be caused by the oxidation enlargement of cracks around fibers or enlargement of cracks in a reaction-formed porous barrier coating (e.g., a silicon-based barrier coating) applied to the carbon-carbon composite.

Elements identified in severely oxidized regions of carbon-carbon composite brake components include potassium (K) and sodium (Na). These alkali contaminants may come into contact with aircraft brakes as part of cleaning or de-icing materials. Other sources include salt deposits left from seawater or sea spray. These and other contaminants (e.g. Ca, Fe, etc.) can penetrate and leave deposits in pores of carbon-carbon composite aircraft brakes, including the substrate and any reaction-formed porous barrier coating. When such contamination occurs, the rate of carbon loss by oxidation can be increased by one to two orders of magnitude.

In various embodiments, components of aircraft wheel braking assembly 10 may reach operating temperatures in the range from about 100° C. (212° F.) up to about 900° C. (1652° F.). However, it will be recognized that the oxidation protection systems and methods of the present disclosure may be readily adapted to many parts in this and other braking assemblies, as well as to other carbon-carbon composite structures susceptible to oxidation losses from infiltration of atmospheric oxygen and/or catalytic contaminants. An oxidation protection system may comprise a protective layer applied to carbon fibers during the manufacturing process of the composite structure.

In general, there are currently two primary methods of manufacturing C/C materials. The first method involves the layup and cure of a carbon fiber, phenolic resin matrix composite, followed by pyrolysis and subsequent phenolic resin infiltration and pyrolysis cycles. Multiple resin infiltration and pyrolysis cycles are typically used until the part achieves the desired density. The second method involves fabrication of an oxidized polyacrylonitrile (PAN) or carbon fiber preform, followed by carbonization and chemical vapor infiltration (CVI) densification. The chemical vapor infiltration cycles are continued, in conjunction with machining the preform between infiltration cycles if desired, until the desired part density is achieved. Combinations of these two basic process methods are also in use and may include variations in preform architecture, infiltration resin type, and chemical vapor infiltration conditions.

With reference to FIGS. 3A, 3B, and 3C flow charts 301, 302, and 303, respectively, of C/C composite structure manufacturing processes are illustrated, in accordance with various embodiments. A C/C composite structure may be produced by using a fiber coating process (step 310), forming an oxidized PAN fiber (step 320), carbonization (step 330), and densification (step 340) in four successive manufacturing steps. An array of carbon fibers, such as a sheet of carbon fibers for example, is coated to help prevent oxidation of the C/C composite structure. The fibrous preform is made utilizing a variety of textile manufacturing techniques. Typically, the fibrous preform is made from oxidized PAN fiber ("OPF"). After the fibrous preform is made, it is carbonized to convert the OPF into carbon fibers. Typically, fibrous preforms are carbonized by placing the preforms in a furnace with an inert atmosphere. As well-understood by those in the art, the heat of the furnace causes a chemical conversion which drives off the non-carbon chemical species from the preform. The resulting preform generally has the same fibrous structure as the fibrous preform before carbonizing. However, the OPF have been converted preferably to almost 100% carbon. After the preform has been carbonized, the preform is densified. In general, densification involves filling the voids, or pores, of the fibrous preform with additional carbon material. This may be done using the same furnace used for carbonization or a different furnace. Typically, chemical vapor infiltration and deposition ("CVI/CVD") techniques are used to densify the porous fibrous preform with a carbon matrix. This commonly involves heating the furnace and the carbonized preforms, and flowing hydrocarbon gases into the furnace and around and through the fibrous preforms. As a result, carbon from the hydrocarbon gases separates from the gases and is deposited on and within the fibrous preforms. When the densification step is completed, the resulting C/C part has a carbon fiber structure with a carbon matrix infiltrating the fiber structure, thereby deriving the name "carbon/carbon." In various embodiments, a second protective layer may be applied to the C/C part after densification to provide an additional protective layer to the outer surface of the C/C part. In this regard, the fiber coating process (step 310) may provide an oxidation protection layer formed around individual fibers of the C/C part, while an additional protective layer may be applied over the outer surface of the C/C part for additional protection to the outer surface of the C/C part. Stated differently, the fiber coating process (step 310) may provide an oxidation protection layer disposed throughout the C/C part, while the additional protective layer provides oxidation protection to the outer surface of the C/C part.

As illustrated, the carbon fiber coating process (step 310) may be performed before forming the oxidized PAN fiber (step 320), after forming the oxidized PAN fiber (step 320) and before carbonization (step 330), or after carbonization (step 330) and before densification (step 340).

In various embodiments, a method for limiting an oxidation reaction in a composite structure may comprise forming a slurry, applying the slurry to carbon fibers, and heating the carbon fibers to a temperature sufficient to dry the carrier fluid and form an oxidation protection layer on the carbon fibers. The protective layer may also be referred to as a coating.

In various embodiments, the slurry may be a slurry sol gel comprising a metal precursor (i.e., a metal salt or a metal alkoxide), and a carrier fluid (e.g., water). The metal salt may be aluminum-based, such as aluminum nitrate (Al$(NO_3)_3$), or silicon-based. The metal alkoxide may be aluminum-based or silicon-based, such as aluminum tri-sec butoxide, aluminum sec-butoxide, aluminum isopropoxide, and/or tetraethylorthosilicate (Si$(OCH_2(CH_3)_2)_4$) (TEOS). In various embodiments, the metal precursor may be other suitable metal-based compounds such as an aluminum compound, a silicon compound, a zirconium compound, a titanium compound, or a calcium compound. In various embodiments, the metal precursor may be other suitable metal-based compounds such as zirconium n-propoxide, titanium isopropoxide, calcium nitrate, and/or any other suitable compound. When sufficiently heated, the slurry may be condensed to an oxidation protection coating comprising, for example, silicon oxide, in the case of silicon based compounds, or aluminum oxide, in the case of aluminum based compounds. In this regard, a method for coating a carbon fiber for a composite structure may comprise condensing the slurry into a silicon oxide.

In various embodiments, the slurry sol gel may further comprise a pH modifier to control the pH of the sol gel. In various embodiments, the pH modifier may be acetic acid, ammonium hydroxide, nitric acid, and/or hydrochloric acid, or any other suitable acid or base. The slurry sol gel may further comprise other additives, such as alcohols and/or surfactants, to adjust the porosity of the sol gel. For example, the slurry sol gel may comprise an additional alcohol such as propanol, isopropanol, methanol, ethanol, n-butanol, or any other suitable alcohol, and/or an ethoxylated acetylene-based or silicone-based surfactant. Additional compounds may be added to the slurry sol gel such as glycerol and/or poly(ethylene) glycol to adjust viscosity. In various embodiments, the slurry sol gel may be substantially free of a binder such as phosphate glass and/or acid aluminum phosphate. In this case, "substantially free" means less than 0.01 percent by weight.

Figure 2:
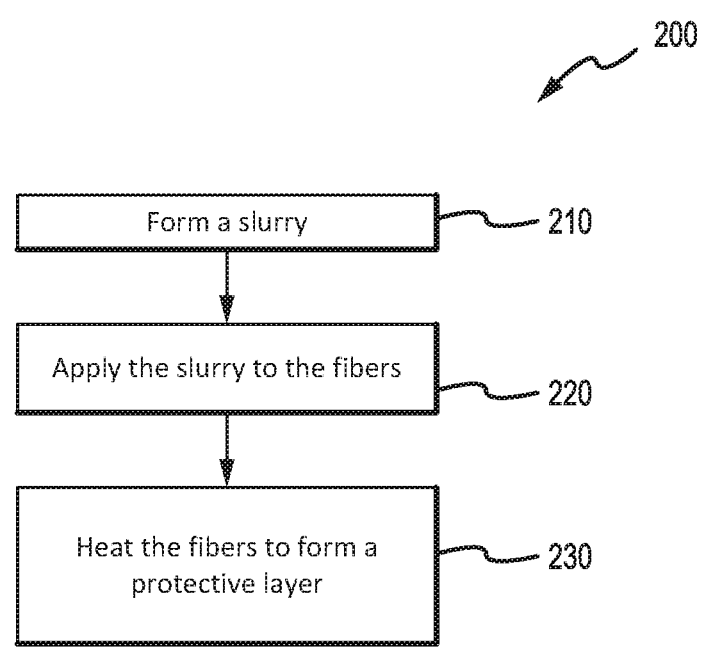
FIG. 2 illustrates a method for coating a composite structure, in accordance with various embodiments.

With reference to FIG. 2, a method 200 for coating carbon fibers for composite structures with an oxidation protection system in accordance with various embodiments is illustrated. Method 200 may, for example, comprise applying an oxidation protection system to individual carbon fibers of carbon-carbon composite brake components. In various embodiments, method 20X may be used on pressure plate 36 and/or end plate 38, stators 34 including slots 56, as well as rotors 32 including lugs 54. The oxidation inhibiting composition of method 200 may be applied to preselected regions of a carbon-carbon composite structure that may be otherwise susceptible to oxidation. For example, aircraft brake disks may have the oxidation inhibiting composition applied on or proximate stator slots 56 and/or rotor lugs 54.

In various embodiments, method 200 may comprise forming a slurry (step 210). In various embodiments, the slurry may comprise a slurry sol gel formed by combining the carrier fluid (i.e., water) with the metal precursor to hydrolyze the metal precursor to form a solution. The metal precursor may be dissolved in an organic solvent prior to the hydrolysis. The solution then may undergo a polycondensation reaction (i.e., gelling), forming a network of interconnected alkoxides (i.e., a gel). The gel is then allowed to age for a desired amount of time and then dried to remove the organic solvent. A final calcination step may remove any remaining organic compounds from the sol gel system. A pH modifier, additional alcohols, and/or surfactants may also be added to the sol gel system, which may be any examples of such components discussed herein.

As an illustrative example of forming an aluminum-based sol gel for the slurry sol gel, aluminum tri-sec butoxide, ethanol, and water may be combined in a 1:16:0.6 mass ratio, respectively, to form a solution. The ceramic material may be added to the solution, making up about 5-90% weight percent of the solution. A small amount of methanol and water may be added to the solution to control porosity (solution:methanol:water in a 1 g:0.2 g:0.0003 g mass ratio). Subsequently, 1 mL of acetic acid may be added for every 30 mL of the resulting solution to gel the resulting solution.

As an illustrative example of forming a silicon-based sol gel for the slurry sol gel, TEOS, ethanol, DI water, and acetic acid may be combined in a mass ratio of 1:4:4:0.05, respectively.

In various embodiments, method 200 further comprises applying the slurry to carbon fibers (step 220). Applying the slurry may comprise, for example, spraying or brushing the slurry onto the carbon fibers. Applying the slurry may comprise, for example, submerging the carbon fibers into a slurry bath. Any suitable manner of applying the slurry to the composite structure is within the scope of the present disclosure. As referenced herein, the composite structure may refer to a carbon/carbon composite structure.

In various embodiments, method 200 further comprises a step 230 of heating the carbon fibers to a temperature sufficient to form a protective layer from the slurry. In various embodiments involving the slurry sol gel, with further reference to step 230, the composite structure may be heated to a sol gel temperature in a temperature range from about 100° C. (212° F.) to about 150° C. (302° F.), or from about 115° C. (239° F.) to about 135° C. (275° F.), to form a sol gel-derived layer. In various embodiments, a second sol gel temperature, which may be higher than the sol gel temperature, (for example, about 300° C. (572° F.) to about 1100° C. (2012° F.)) may then be used to form a crystalline sol gel-derived layer. Heating the composite structure at the sol gel temperatures may take place for a period between about 0.5 hour and about 8 hours, wherein the term "about" in this context only means plus or minus 0.25 hours. Subsequent to heating the composite structure to the sol gel temperature, the slurry sol gel may be reapplied to the composite structure one or more additional times, similar to step 220, thereby creating multiple sol gel-derived layers from the slurry sol gel.

Figure 4:
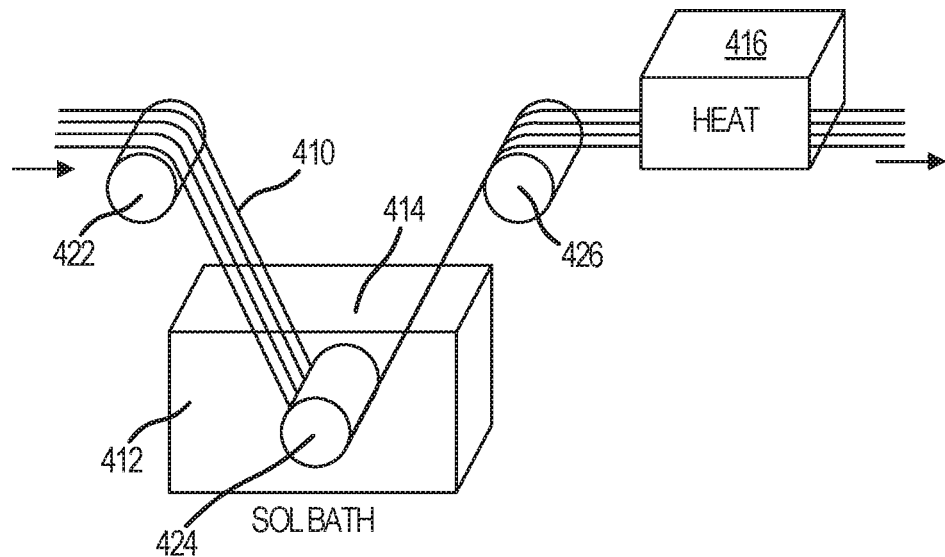
FIGS. 4 and 5 illustrate carbon fiber coating processes according to FIG. 3A, in accordance with various embodiments.

With combined reference to FIG. 2 and FIG. 4, step 220 may include submerging carbon fibers 410 in a slurry bath 412. For example, strands of carbon fibers 410 may be directed via an arrangement of rollers, such as roller 422, roller 424, and roller 426 for example, into slurry bath 412. Slurry bath 412 may be filled with a slurry 414. Step 230 may include directing carbon fibers 410 through a heater 416 to dry the slurry 414 solution to form the protective layer. In various embodiments, the protective layer may completely encase the carbon fibers 410. Stated another way, the protective layer may cover the entire outer surface of carbon fibers 410. Step 230 may include condensing the slurry into the protective layer, such as a silicon oxide layer. In various embodiments, the slurry may condense in response to heat.

Figure 5:
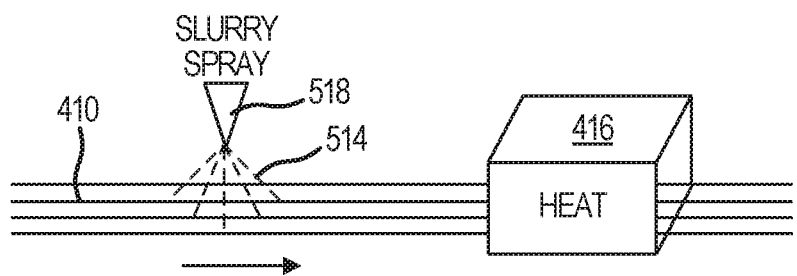

With combined reference to FIG. 2 and FIG. 5, step 220 may include spraying carbon fibers 410 with a slurry 514. For example, a nozzle 518 may spray the slurry onto the carbon fibers 410. In various embodiments, in response to carbon fibers 410 being coated with a slurry comprising TEOS, heating carbon fibers 410 with heater 416 may treat the slurry to effectively decompose into silica.

Figure 6:
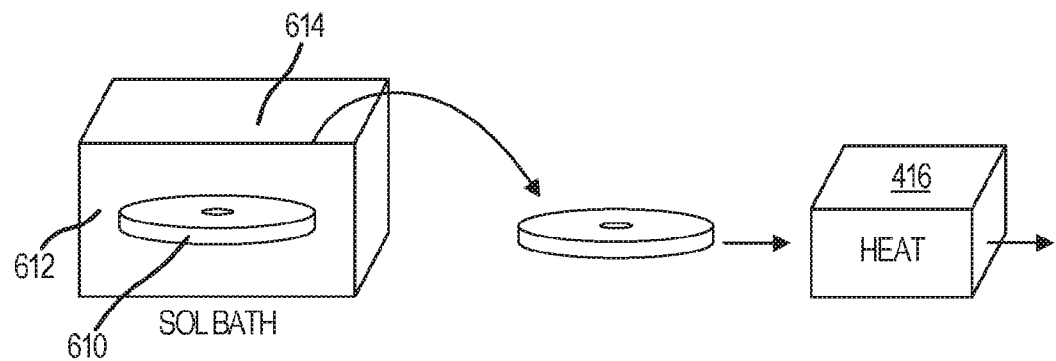
FIGS. 6 and 7 illustrate carbon fiber coating processes according to FIGS. 3B and 3C, in accordance with various embodiments.

With combined reference to FIG. 2 and FIG. 6, step 220 may include submerging fiber preform 610 in a slurry bath 612. For example, fiber preform 610 may be submerged in slurry 614 of slurry bath 612. Step 230 may include heating fiber preform 610 via heater 416 to dry the slurry 614 to form the protective layer.

Figure 7:
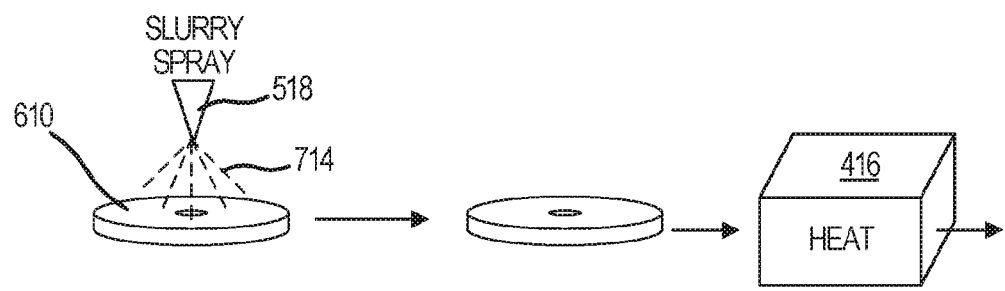

With combined reference to FIG. 2 and FIG. 7, step 220 may include spraying fiber preform 610 with a slurry 714. For example, nozzle 518 may spray the slurry 714 onto the fiber preform 610. In various embodiments, in response to fiber preform 610 being coated with a slurry comprising TEOS, heating fiber preform 610 with heater 416 may treat the slurry to effectively decompose into silica.

In various embodiments, slurry sol gels are also sprayable in application to a composite structure, making their application to a composite structure less expensive than a coating requiring application by CVD.

In various embodiments, applying the oxidation protection system to the C/C composite structure before the densification process may allow the oxidation protection system to be dispersed throughout the structure.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A. B and C may be present in a single embodiment; for example, A and B, A and C, B and C, or A and B and C.

Systems, methods and apparatus are provided herein. In the detailed description herein, references to "one embodiment." "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for coating a fiber for a composite structure, comprising:
    applying a slurry comprising tetraethylorthosilicate (TEOS) onto the fiber;
    forming an oxidized polyacrylonitrile fiber (OPF) preform from the fiber;
    carbonizing the OPF preform and the slurry;
    heating the slurry to a temperature sufficient to form a protective layer on the fiber; and
    condensing the slurry into a silicon oxide.

2. The method of claim 1, wherein the protective layer is configured to aid in preventing oxidation of the carbon fiber.

3. The method of claim 2, wherein the applying the slurry is completed by at least one of submerging the fiber into a slurry bath, spraying the slurry onto the fiber, or brushing the slurry onto the fiber.

4. The method of claim 3, wherein the temperature is between 100° C. (212° F.) to about 1100° C. (2012° F.).

5. The method of claim 1, wherein the protective layer encases the fiber.

6. A method for manufacturing a composite structure, comprising:
    forming an oxidized polyacrylonitrile fiber (OPF) preform from a fiber;
    carbonizing the OPF preform;
    applying a slurry to the carbonized OPF preform;
    heating the carbonized OPF preform and the slurry to a temperature sufficient to form a protective layer on the fiber; and
    densifying the carbonized OPF preform to form the composite structure.

7. The method of claim 6, wherein the applying the slurry is completed by at least one of submerging the fiber into a slurry bath, spraying the slurry onto a surface of the fiber, or brushing the slurry onto the surface of the fiber.

8. The method of claim 7, wherein the protective layer is configured to help prevent oxidation of the fiber.

9. The method of claim 8, wherein the slurry comprises at least one of aluminum nitrate, calcium nitrate, aluminum sec butoxide, aluminum tri-sec butoxide, aluminum isopropoxide, aluminum oxide, and tetraethylorthosilicate (TEOS).

10. The method of claim 6, further comprising applying a second protective layer to an outer surface of the composite structure.

11. A method for manufacturing a composite structure, comprising:
    forming an oxidized polyacrylonitrile fiber (OPF) preform from a fiber;
    coating the OPF preform with a slurry;
    carbonizing the coated OPF preform;
    heating the carbonized OPF preform and the slurry to a temperature sufficient to form a protective layer on the carbonized OPF preform; and
    densifying the carbonized OPF preform to form the composite structure.

* * * * *